United States Patent [19]

Trema

[11] Patent Number: 4,993,734
[45] Date of Patent: Feb. 19, 1991

[54] COUPLING DEVICE BETWEEN A STEERABLE WHEEL AND A STEERING CONTROL MEMBER

[75] Inventor: Daniel Trema, Bezons, France
[73] Assignee: Elf France, Courbevoie, France
[21] Appl. No.: 317,924
[22] Filed: Mar. 2, 1989

[30] Foreign Application Priority Data

Mar. 14, 1988 [FR] France ............... 88 03281

[51] Int. Cl.⁵ ........................... B62K 25/08
[52] U.S. Cl. ................... 280/276; 280/668; 180/219; 180/227
[58] Field of Search ............ 280/276, 224, 277, 670, 280/696, 710, 668, 284, 286, 283, 25, 666, 92; 180/268, 227, 219, 216, 223

[56] References Cited

U.S. PATENT DOCUMENTS

| 412,322 | 10/1889 | Copeland | 280/276 |
| 2,369,644 | 12/1941 | Barry et al. | 280/660 |
| 4,542,910 | 9/1985 | Watanabe | 280/276 |
| 4,735,276 | 4/1988 | Burton | 280/276 |
| 4,773,499 | 9/1988 | Frye | 280/92 |
| 4,834,412 | 5/1989 | Trema | 280/276 |

FOREIGN PATENT DOCUMENTS 0889516 12/1981 U.S.S.R. .

Primary Examiner—Charles A. Marmor
Assistant Examiner—A. M. Boehler
Attorney, Agent, or Firm—Burgess, Ryan & Wayne

[57] ABSTRACT

A coupling device between a vehicle steerable wheel and a steering control member, the steerable wheel being carried by a single arm, connected to a suspension arm rotatively mounted, at one of its ends, on a transversal axis of the chassis of the vehicle, wherein the single arm comprises a transmission and guiding rod directed eccenteredly upwards and rigidly fixed thereupon and this rod cooperates with a slide bar on which is pivotally connected at one end, at least one link, and the said device being applied to steering couplings for MacPherson type front suspension motorcycles.

10 Claims, 2 Drawing Sheets

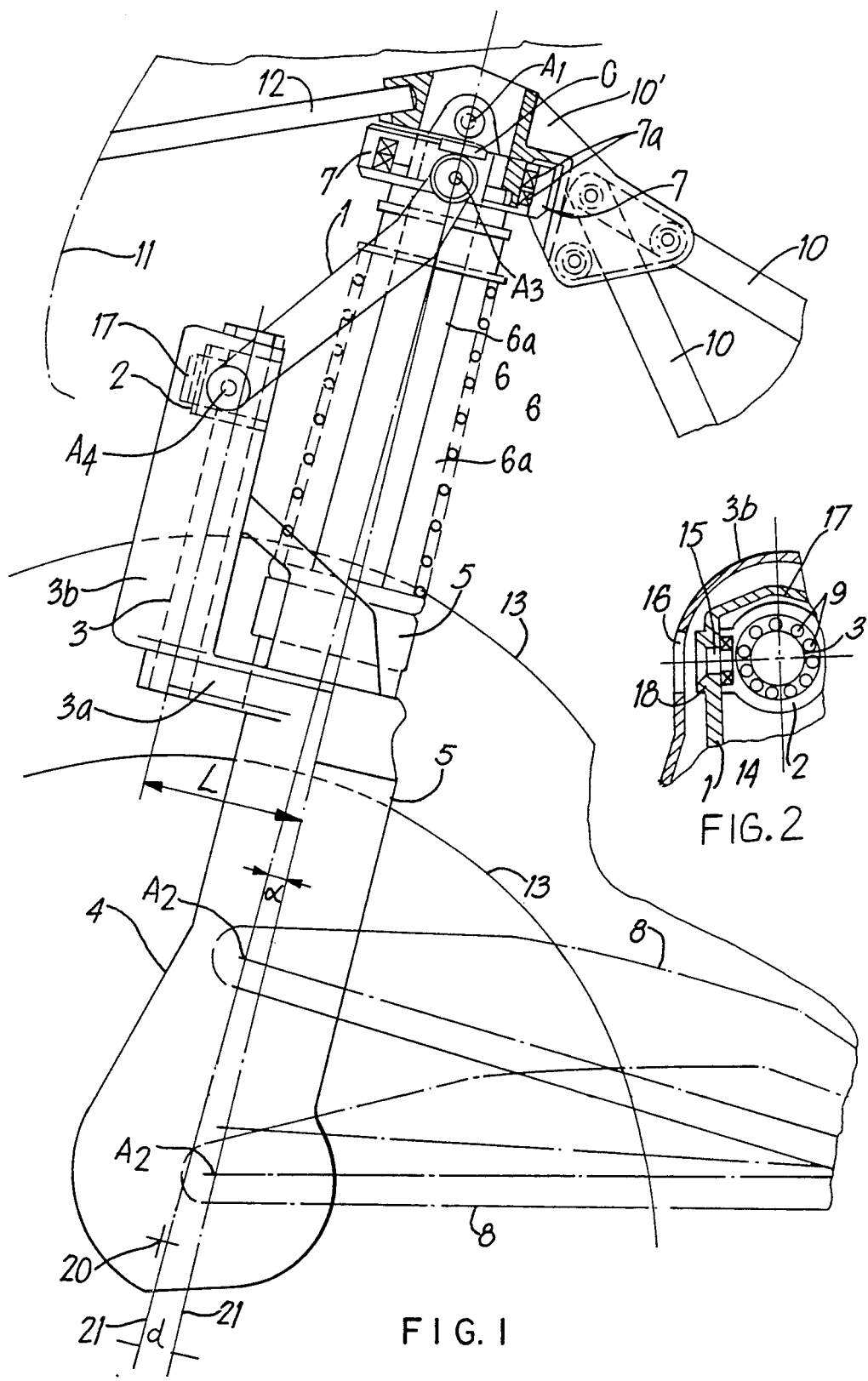

COUPLING DEVICE BETWEEN A STEERABLE WHEEL AND A STEERING CONTROL MEMBER

BACKGROUND OF THE INVENTION

Field of the invention

The present invention concerns a single front suspension arm, for supporting and steering a motorcycle wheel connected to the chassis of the motorcycle by a suspension spring directly interposed between this arm and said chassis, the said arm being adapted to turn about an axis of direction substantially orthogonal to that of the said wheel and located substantially in the median longitudinal plane of the motorcycle. The invention can furthermore, be applied, with the addition of corresponding means, to other cases, such as for example that of special vehicles provided with multiple steerable wheels in which steering the wheels can be performed wheel by wheel and where the wheel driving and steering transmission means to the wheel are located advantageously as high as possible, such as is the case especially with certain all-purpose vehicles, and light aircraft.

The suspension of a vehicle body or chassis must, in order for the vehicle to retain correct road holding, be provided independently for each wheel, but this requirement results in connections between the wheel and the suspension and steering means being complex. The suspension of fourwheeled vehicles has been greatly simplified by the type of suspension known as "Mac Pherson suspension" and described for example in French patent No. 1 156 145. In the case where this type of suspension is applied to a steerable wheel, the wheel stub axle is rotatively mounted on a support arm that is connected to a shock-absorber tube connected by a link to the central portion of the chassis and the body of the vehicle rests, in a relatively high rest position, directly upon a helical spring which is thus located abutted by its upper end against a rest plate integral with the body and by its lower end against a rest shoulder integral with the shock-absorber tube or forming part of this latter.

This compact and economical suspension solution has been widely adopted in the manufacture of automobiles but until now it has never been used for vehicles having a single front steerable wheel as motorcycles since these latter require a front wheel bearing perfectly centered in the plane of symmetry of the wheel.

The prior art contributed certain solutions to this problem by proposing for the front wheel of the motorcycle a Mac Pherson type suspension where the single wheel is carried by a single arm forming the support leg and connected to a suspension arm through a ball and socket-pivot connection centered upon the steering axle of the front wheel.

In order to obtain the connection between the handle bar and the front wheel, it has been proposed to use high and low links, pivotally connected to one another, and rotatably mounted respectively, for the higher one in a steering part moved by the handle bar and the lower link on the single arm parallel to the wheel stub axle and according to an axis substantially perpendicular to the steering axis. This type of pivoting links connection between the handle bar and the single wheel arm operates correctly and allows precise steering but has proved to be too bulky, with respect to the scissor-like movement of the links that requires, in closed scissor position, a large amount of space towards the front.

The present invention concerns a particularly advantageous novel solution from the point of view of bulkiness (thus adapted to be covered in a very aerodynamic manner) and from the point of view of reliability in all the movement situations of the telescopic unit, to the problem consisting of guiding a single arm carrying a wheel stub axle and motorcycle front steerable wheel, the said single arm being directly connected to the chassis through a suspension spring and by one (or several) suspension arm(s).

Another object of the invention is to apply the steering means of the main object to vehicles other than a front steerable wheel motorcycle, in which the steering control mechanism is not performed by means of a handle bar but for example by means of suitable control means, these means being mechanical, hydraulic, electric, pneumatic or other, thus allowing to control the steering of a single arm carrying a steerable wheel, stub axle or wheel axle, without requiring to provide a bulky rigging around the median portion and if possible also around the upper part of the said suspensionsteering block. Such a solution can be applied for example among others to special vehicles in which is not necessarily sought an identical steering at any moment of two wheels of a pair of left and right wheels, such as has been the case up to now with classical motor vehicles.

According to the invention, a coupling device is proposed between a vehicle steerable wheel and a steering control member, the steerable wheel being carried by a single arm connected to a suspension arm mounted rotatably on a transverse axle of the vehicle body and, at one of its ends, at its other end, mounted pivotally on the transverse arm by a swivel and ball joint, the pivoting center of which is located in the alignment of the rotation axis of the steering arm and a suspension and-/or shock-absorber block, for example with telescopic cylinder and movable rod, being interposed between an upper rest end of the single arm and a rest piece mounted fixedly on the chassis of the vehicle or forming part thereof, wherein the single arm comprises a transmission and guiding rod directed upwards and eccentrically and rigidly fixed thereupon and this rod cooperates with a sliding bar, upon which is pivotally connected at one end at least one link the other end of which is pivotally connected to a steering ring connected to the steering control member.

The transmission and guiding rod can be disposed over its whole length at a distance substantially constant from the axis of rotation, of the single arm, i.e. is substantially parallel to that axis, or it can be inclined with respect to the axis of rotation of the single arm in order to substantially match the surface of a cone during the rotation of the single arm about its axis.

According to another embodiment of the invention, the transmission and guiding rod is hollow and is provided with an outer surface hardened by any appropriate means and rolling sliding means, for example ball bearings, roller bearings, needle bearings, are interposed between the sliding bar or piece and the transmission and steering rod.

The sliding piece and/or at least the outer surface of the transmission and steering rod are preferably made of a material producing low friction and the transmission and guiding rod presents a cylindrical outer surface.

According to another embodiment improving the guiding of the slide bar on the rod, at least two parallel crowns of bearing members, for example, balls, rollers, needles, are interposed between the slide bar and the transmission and the transmission and guiding rod.

According to a further embodiment, the link is constituted by two distinct links linked to each other by a C-shaped part in order to form a single-piece assembly, these two distinct links being pivotally connected by their lower end on the slide bar that surrounds at least one rolling member interposed between the transmission rod and the slide bar ring.

In order to avoid the degradation of the transmission and guiding rod by projections during shell integral with the coupling support carrying the said transmission rod and integral with the single arm.

BRIEF DESCRIPTION OF THE DRAWINGS

Other aims, advantages and features will become apparent from the following description of an embodiment of the invention, given by way of non-limitative illustration with reference to the appended drawing in which:

FIG. 1 is a partial schematic view in lateral elevation of the front of a motorcycle comprising a shock-absorbing and/or suspension assembly for a front steerable wheel and a steering control member according to the invention, shown in the position of the maximum extension of the suspension spring represented in the upper part by a half-section according to the median longitudinal plane of the vehicle;

FIG. 2 is a fragmentary view on a larger scale in transversal cross-section according to a plane perpendicular to the axle of the wheel (or the wheel stub axle), of the pivoting connection between the low end of a steering link and a slide bar.

FIG. 1 represents an assembly showing a part of the chassis 10 connected to an extension 10' placed above a steering ring 7 integral with a handle bar G. The steering ring 7 mounted rotatably around the extension 10' by ball bearings 7a, is connected by two parallel links 1 (only one of which is represented) to a single arm 4 for supporting a front wheel 13. The links 1 are pivotally connected in A3 on the steering ring and in A4 on a slide bar 2 guided slidingly on a rigid rod 3 carried by a support 3a integral with the single arm orientable in rotation along a steering axis 21 carried by the wheel axle 20. The support 3a is represented in low position in full lines and in high position in mixed lines with the single arm 4, which is connected by a joint A2 to a rotatable connecting arm pivotally connected on the chassis of the motorcycle. A telescopic shock-absorber and/or suspension unit here constituted by a shock-absorber 5 and by a helical spring 6 surrounding the shock-absorber, is integral by its shock absorbing body part with the upper part of the single arm 4. The piston rod 6a of the shock-absorber 5 is pivotally connected in A1 to the extension 10' that carries furthermore a support arm 12 of a fairing 11.

Figure 3:
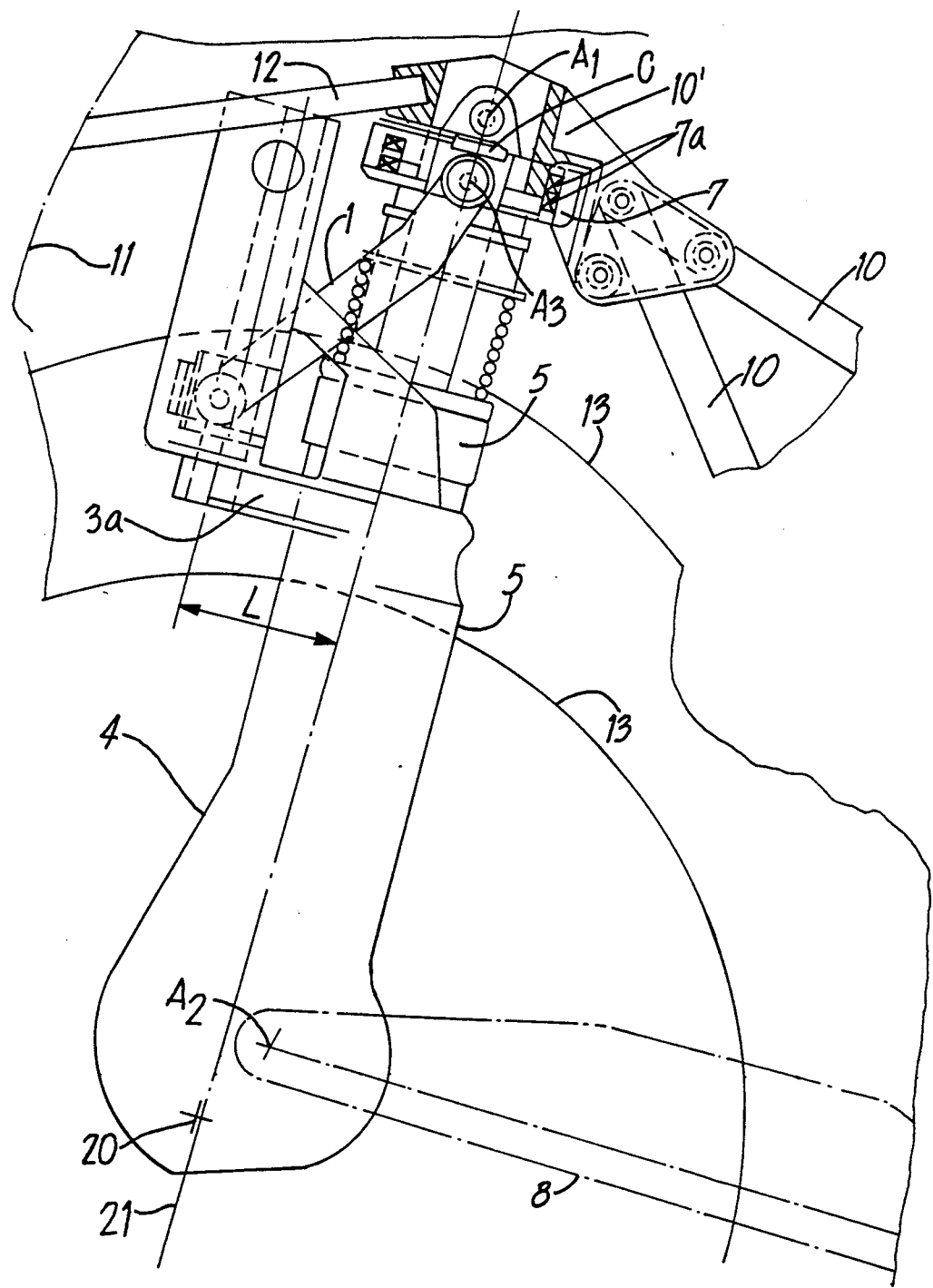
FIG. 3 is a view identical to FIG. 1 but in a position of maximum compression of the suspension spring.

The spring-shock absorber assembly 5, 6 is thus pivotally connected by pivoting connection A1 with the extension 10' integral by a triangle of bars with the motorcycle body. The pivoting connection A1 allows the shock absorber and/or suspension 5, 6, 6a to pivot by a small angle alpha with respect to the chassis 10 due to the slight forward or rearward movement of the joint A2 with the suspension arm 8 during the alternate movements of the telescopic unit, causing a rotation of the suspension arm 8.

These alternate movements of an angle alpha also provoke a corresponding upward movement of the rod 3 carried with its shell 3b by the support 3a. The rod 3 is thus, displaced inside the ring-shaped slide bar 2 with minimum friction due to the series of ball crowns 9 that are interposed between the slide bar ring 2 on which are pivotally connected the links 1 and the outer surface of the hollow rod 3.

The slide bar 2 is constituted and mounted in an appropriate manner so as to slide easily on the outer cylindrical surface of the rod 3; here by means of balls, needles, or rollers, other means also being able to be used in this aim according to known techniques, for example by means of a simple journal bearing, the slide bar 2 and the rod 3 having good friction qualities obtained for example by covering with a layer of plastic material.

The link represented in further detail in FIG. 2 comprises two branches or legs made of sheet metal forming however an integral piece but which could also only comprise a single branch or could even be replaced by two separated links. The solution represented and preferred is one of an integral link having two branches connected to each other by a C-shaped part 17 and of which the lower and thicker parts adjacent to the C-shaped part 17 are mounted to the left and to the right of the slide bar, in such a manner as to provide good stiffness.

FIG. 2 also shows in further detail the joint A4 between the links 1 and the slide bar 2. The end of the link 1 carries, mounted on a series of ball crowns 9, the slide bar ring 2 that itself carries in diametrically opposed positions ball bearings 14, the axis of which is perpendicular to that of the tubular rigid rod 3. Each of these ball bearings 14 cooperates with an axis 15 urged upon the links 1 after having been introduced through an opening 16 provided through the shell 3b of the rod 3. The joint A4 can thus support the shifts with respect to the axles of the pivoting parts and which are able to be provoked by the geometry of the system but also by distortions due to slight but real flexibility of the opposed parts.

In the case where the guiding rod 3 of the slide bar is not parallel to the axis of rotation of the single arm, this joint A4 and the joint A3 allow the links, to perform pivoting movements of small amplitude due to the shifts of the slide bar 2 with respect to the axis of rotation of the single arm and required by the form of the displacement and guiding path.

When the steering crown 7, driven by the handle bar G or other means, rotates about the steering axis 21, the links 1 are driven in rotation and also rotate by their low end located at a distance from the steering axis 21. The action of the links 1 on the lever arm L of the support 3a exerts on the single arm 4 a torque that drives in rotation substantially of the same angle as the handle bar G and which thus drives the wheel 13 carried by stub axle according to the axis 20, perpendicular to the axis of rotation of the suspension arm 8. This torque is exerted whatever the position of the slide bar with respect to the rod 3 that follows the movement of the single arm 4 with respect to the extension 10' of the chassis. During these movements of the arm 4 with respect to the extension 10', the axis of rotation 21 of the single arm 4, i.e. the steering axle, is displaced by an angle alpha between the low position of the wheel 13 and its high position with respect to the chassis of the motorcycle.

In the case of the embodiment represented in FIGS. 1-3, the lever arm L for applying the rotatory force on the single arm 4 is almost constant due to the fact that the rod 3 is substantially parallel to the axis of rotation of the single arm. By inclining or cambering the rod 3 and by providing for the slide bar 2 sliding and/or bearing means adapted to this inclination or to this cambering, it is possible to vary the length L of the lever arm in function of the movement position of the suspension, for example to foresee exerting the same force to the handle bar G, a greater steering torque when the front suspension is compressed and the load on the front wheel is maximal.

It will be easily understood that a steering coupling device according to the invention can be controlled by other actuating means than a motorcycle handle bar or steering wheel, in order to be used especially in vehicles having several steerable wheels, in which it is desired to have a suspension-steering arm that can be actuated by a device presenting small bulkiness and, furthermore, which is disposed as high as possible, so as to be able to be implanted in a reduced volume. These actuating means can be controlled themselves by signals transmitted by a logic device itself supplied upstream by data representatives of the movement of the vehicle and commands given by the driver, and which are analyzed and transformed in a manner known per se by said logic device.

Of course, it is well understood that the present invention is in no way limited to the embodiments described and represented herein-above and it can be adapted to numerous alternatives available to those skilled in the art without departing from the scope and spirit of the invention especially when the single arm 4 and a part of the pieces that are fixed thereto are made by total or partial welding or by winding or inter-crossing of fibers.

I claim:

1. A coupling device between a steerable wheel of a vehicle having a chassis and a steering control member of said vehicle, the steerable wheel being carried by a single arm connected to a suspension arm rotatably mounted at one of its ends on a transverse axis of the chassis of the vehicle, and at its other end, pivotally mounted on the single arm for defining an axis of rotation of the single arm and the steerable wheel and a suspension and shock absorbing unit with a movable rod being interposed between an upper end of the single arm and the chassis of the vehicle, wherein the single arm comprises a guiding rod directed eccentrically upwards and rigidly fixed upon the single arm and wherein the guiding rod cooperates with a slide bar ring which is pivotally connected with a first end of at least one link and a second opposite end of said at least one link being pivotally connected to a steering ring connected to the steering control member.

2. A coupling device according to claim 1, wherein the guiding rod is disposed over its entire length substantially parallel to the axis of rotation of the single arm.

3. A coupling device according to claim 1, wherein the guiding rod is inclined with respect to the axis of rotation of the single arm in order to match substantially a surface of a cone during the rotation of the single arm about its axis.

4. A coupling device according to claim 1, wherein the guiding rod is hollow and provided with an outer surface hardened by any appropriate means.

5. A device according to claim 1, further including sliding and rolling means, interposed between the slide bar ring and the guiding rod.

6. A coupling device according to claim 1, wherein the slide bar ring and at least the outer surface of the guiding rod are made of a material having good friction qualities.

7. A coupling device according to claim 1, wherein the guiding rod is provided with a cylindrical outer surface.

8. A coupling device according to claim 1, further including least two parallel crowns of rolling members which are interposed between the slide bar ring and the guiding rod.

9. A coupling device according to claim 1, wherein the at least one link is constituted of two distinct links connected to each other to form an integral piece, these two distinct links being pivotally connected by their low end on the slide bar ring that surrounds at least one bearing member interposed between the guiding rod and the slide bar ring.

10. A coupling device according to claim 1 wherein the guiding rod is surrounded by a protection and guiding shell integral with a coupling support which bears said guiding rod and is integral with the single arm.

* * * * *